Patented June 26, 1951

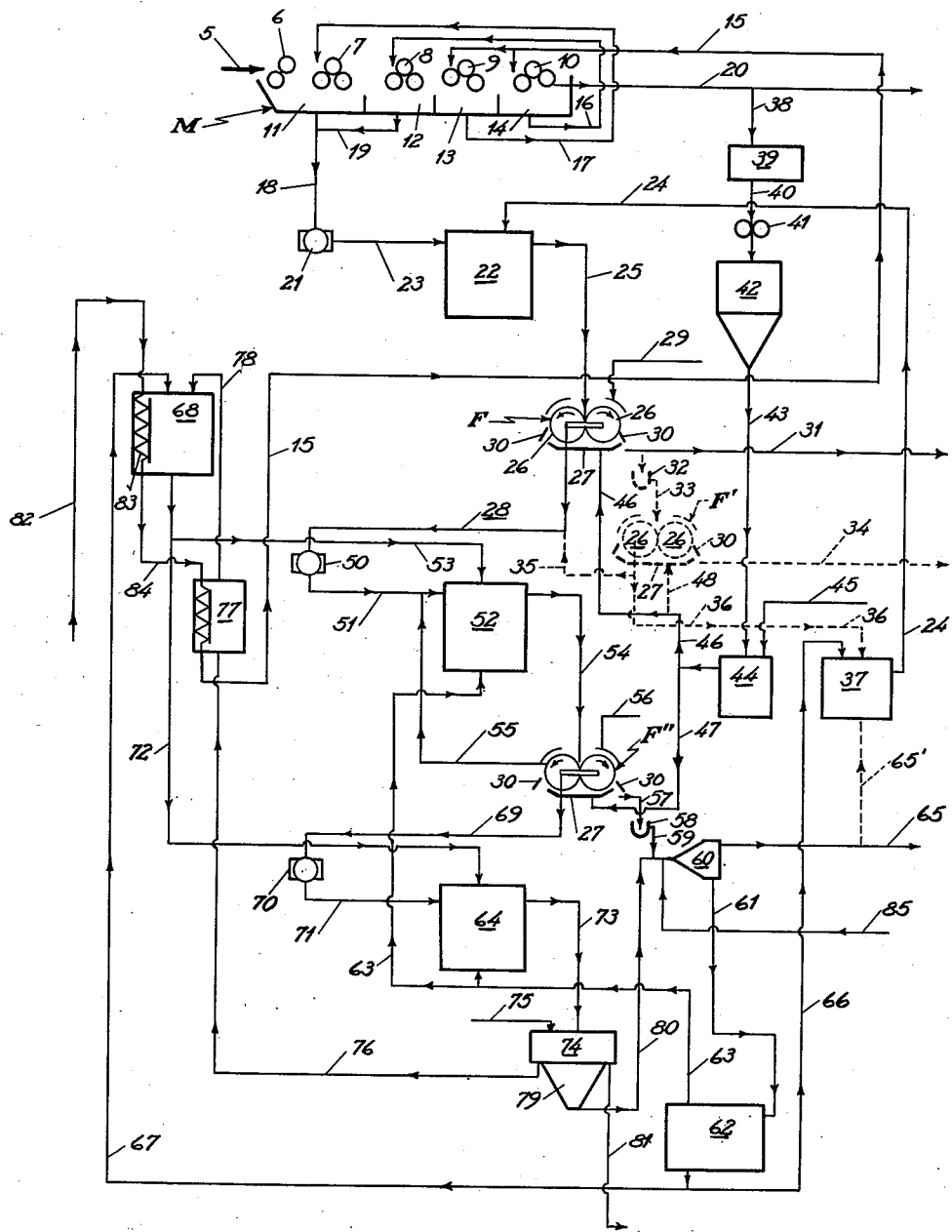

2,557,996

UNITED STATES PATENT OFFICE 2,557,996

PROCESS OF TREATING SUGAR JUICES

C. Lynn Peterson, Salt Lake City, Utah, assignor to Peterson Filters and Engineering Co., Salt Lake City, Utah, a partnership Application July 26, 1945, Serial No. 607,253

11 Claims. (Cl. 127—44)

This invention relates to the treatment of liquids containing sugar, and more particularly to the treatment of raw sugar cane juice.

Although sugar in various forms is contained in many plants, such as grapes, maple trees, and the like, the principal sources of sugar are the cane sugar plant and the sugar beet. Sugar juice or liquid containing sugar is extracted from sugar cane by crushing the cane and then treating the juice to remove impurities, followed by evaporation and crystallization, to drive off the liquid and to recover the sugar in crystalline form. Beet sugar is extracted by cutting or slicing the beets into relatively long slices or slivers, termed "cossettes," and passing heated water through the cossettes to remove the sugar content. The treatment of the beet sugar juice so formed is similar to the treatment of cane sugar juice to recover the sugar in crystalline form.

An essential difference between beet and cane sugar juice lies in the fact that the cane sugar juice contains gums, waxes, and other wax-like materials which are found in the cane stalk, but not in the sugar beet, and produce considerable difficulty in the economical treatment of cane sugar juice.

In the treatment of both cane and beet sugar juice, lime is utilized as a reagent to remove organic acids and other impurities, the excess lime normally being removed by carbonation, as by the introduction of $CO_2$ gas, to precipitate the excess lime in the form of $CaCO_3$. In the treatment of cane sugar juice, milk of lime, $Ca(OH)_2$, is utilized as the lime reagent, but in the treatment of beet sugar juice a lime saccharate, i. e., a compound of sugar and lime, such as calcium mono-saccharide or calcium tri-saccharide, is utilized to introduce lime into the juice. The latter is advantageous in many ways, since wash water containing relatively small amounts of sugar can be mixed with lime to produce the lime saccharate, and thereby readily recover a portion of the sugar which would otherwise require considerable evaporation treatment, and the like. Also, with lime saccharate, a more complete reaction of the organic acids and other impurities is usually obtained. However, when an attempt is made to treat cane sugar juice with lime saccharate instead of milk of lime, the precipitate formed is impractical to filter on a commercial scale, due principally to the gums and waxes present.

Among the objects of this invention are to provide an improved process of treating liquids containing sugar; to provide an improved process of treating liquids containing sugar and also gums, waxes or wax-like impurities; to provide a process of treating cane sugar juice by which many difficulties due to the presence of gums and waxes may be overcome; to provide a process of treating cane sugar juice which will permit the effective use of lime saccharate; to provide such a process in which a calcium carbonate cake is produced which may be readily separated in a novel manner; to provide such a process in which the lime may be easily recovered and reused; to provide such a process in which the gums and waxes may be readily removed by filtration; to provide such a process which includes filtration steps in which a filter aid is used, and in which the filter aid is produced from the raw material, such as the sugar cane bagasse; to provide such a process in which the liming and carbonating steps are carried out more efficiently; to provide a process of treating liquid containing sugar, in which incoming water may be purified and a sludge produced which may be further treated to provide make-up lime; and to provide a process by which cane sugar juice may be treated similarly to beet sugar juice.

Other objects and the novel features of this invention will become apparent from the description which follows.

In general, the process of this invention, as applied to cane sugar juice extracted by rolls, or the like, includes partial liming of the juice at a lower temperature, such as between 120° F. and 160° F.; washing and filtration to remove gums, waxes, and other wax-like impurities coagulated thereby; subsequent liming and carbonation, preferably under vacuum, for precipitation of excess lime and additional impurities, such as organic acids; and filtration for removal of the precipitates. The initial liming step may be accomplished by using either milk of lime or lime saccharate as a reagent, and subsequent liming steps are preferably accomplished by using lime saccharate as a reagent.

In further accordance with this invention, the lime cake removed by filtration is purified in a centrifuge, as of the continuous type, so that hydrates, silicates, and salts other than calcium will be removed, followed by calcination, as in a kiln, for reuse of the lime.

Additionally, in accordance with this invention, the filtration steps are preferably accomplished by the use of a precoat material in a filtration process and apparatus, such as disclosed and claimed in the copending application Ser. No. 440,858, filed April 28, 1942, now Patent 2,403,021, by Clarence J. Peterson and myself, entitled "Method and Apparatus for Filtration." The precoat material is preferably charcoal produced by suitable treatment of a portion of the bagasse produced in crushing the cane to obtain the raw juice.

In still further accordance with this invention, incoming water, which is preferably flowed or sprayed onto the crushed cane to extract additional sugar, is treated so as to become relatively highly alkaline, as by reagents including lime and soda ash, and the sludge from the water treatment is passed to the same centrifuge as the lime cake, in order to recover the lime and thereby provide additional lime as make-up.

Additional novel features will become apparent from the following more detailed description, taken in connection with the accompanying drawing, which is a diagrammatic plan or flow sheet representing one manner in which the process of this invention may be carried out.

As shown in the drawing, the sugar cane is carried by suitable means, such as a conveyor 5, to a mill M having initial rolls 6 and four sets of crushing rolls 7, 8, 9, and 10, each set of crushing rolls being disposed above a compartment 11, 12, 13, or 14, respectively. Relatively pure or specially treated water is sprayed or flowed from a water inlet line 15 onto the cane as it passes through the rolls 9 and 10. Such water is preferably heated to a suitable temperature, such as 140° F., and is treated so as to be relatively highly alkaline, such as to have a pH of about 10. The liquid and juice from rolls 10 collects in compartment 14, and is preferably recirculated through a line 16, so as to be sprayed or flowed onto the cane passing through the second set of crushing rolls 9. Similarly, the liquid and juice collecting in compartment 13 may be recirculated through a line 17 to be sprayed or flowed onto the cane as it passes through the first set of crushing rolls 7. The fresh water flowed or sprayed onto the cane passing through the last two sets of rolls 9 and 10 tends to extract a maximum amount of sugar, while the liquid thus produced, although containing sugar, is able to abstract additional amounts of sugar in the first two sets of rolls. The raw juice collecting in compartments 11 and 12 flows into a raw juice pipe 18 and a branch 19 thereof for further treatment, while the residual cane or bagasse is removed by a conveyor 20.

The raw juice so produced may be first passed from pipe 18 into a heater 21, and thence to a limer 22 through a pipe 23. In heater 21, the juice is heated to a suitable temperature so as to insure that the liming step will be carried out at a temperature at which the gums, waxes, and wax-like impurities will coagulate or form colloidal dispersions, or the like, which can be filtered out. The temperature at which the initial or partial liming takes place will, of course, depend upon the type and amount of impurities in the raw juice, but is preferably sufficiently high so that the wax-like impurities will coagulate, but not sufficiently high so that they will melt and again go into solution. For the usual type of cane, this temperature should be somewhere between 120° F. and 160° F., with a temperature of about 140° F. usually being desirable.

The partial liming preferably takes place under a relatively high vacuum, such as 27" Hg, milk of lime or lime saccharate being supplied through line 24, after preparation in a manner to be described later. A suitable limer for use herein may be of the type disclosed and claimed in my co-pending application Ser. No. 620,966, filed October 8, 1945, now Patent 2,520,957 and entitled "Method of and Apparatus for Treating Liquids Under Vacuum." Such a limer may include a rotating distributing disc for discharging the milk of lime or lime saccharate tangentially against and into a thin film of juice flowing downwardly along the periphery of a vertical cylinder surrounding the lime distributing disc. The amount of lime added to the juice in the limer 22 is preferably sufficient to bring the liquid to substantially a neutral or slightly alkaline condition, i. e., to a pH of about 7.0 to 7.5. Under such conditions, the gums, waxes and other wax-like impurities tend to coagulate sufficiently for removal by filtration, for which purpose the partially limed sugar juice is passed from limer 22 through an outlet pipe 25 to a filter F.

The filter F is preferably of a special type particularly suitable for filtering liquids containing substances such as the coagulated gums, waxes and the like which are normally relatively difficult to filter. The filter F may be constructed in the manner disclosed and claimed in Patent Number 2,403,021, and entitled "Method and Apparatus for Filtration." Such a filter includes a pair of sectional drums 26 rotated in opposite directions, away from each other at the top, and provided about their circumferential peripheries with a suitable filter medium, the filter medium of the drums contacting, or closely approaching contact along a horizontal line between the drums. Suitable end seals are provided, so that a pool of material to be filtered may be maintained above and between the drums. To prevent the waxes and the like from blinding or clogging the filter medium or cloth, a precoat material is deposited upon the filter medium prior to passage of successive filter sections through the material to be filtered. In the present instance, such precoat material preferably comprises a water mixture of charcoal contained in a tank 27 into which the lower portion of each drum extends.

By the suitable production of vacuum influences, the liquid carrying charcoal is drawn through the filter medium, and a layer of charcoal deposited thereon. As each successive section of the filter medium, upon which the charcoal layer has been so deposited, passes into the body of material to be filtered contained in the space above and between the drums, a layer of coagulated gums, waxes, and other wax-like impurities is deposited upon the layer of charcoal. At the same time, the sugar juice is drawn through the filter medium by suitable vacuum influences into a pipe 28. Preferably, the vacuum is maintained while the cake thus deposited passes under a spraying or washing device supplied by a wash water line 29, the wash water preferably being at a temperature, such as 140° F., about the same as the sugar juice, to maintain the coagulated condition of the waxes, and the like. As each section of the filter medium passes further around the drum, the vacuum is changed to pressure, and the deposited layers of charcoal and waxes and other impurities are removed, as by scrapers 30.

During washing, the sugar juice retained in the cake of charcoal and waxes and other impurities is displaced by the wash water, so that substantially all of the sugar juice is recovered. After being removed by the scrapers, the waxes and the like may be conveyed through a pipe or flume 31 to a point at which the waxes may be recovered, if desired, by separation from the charcoal and other constituents.

In the event that sufficient washing is not obtained, the removed cake from filter F may be diverted from wax discharge pipe 31, and instead passed into a repulping tank 32, and thence through a pipe 33 to the body or pool of material maintained above and between the drums 26 of a filter F'. In repulping tank 32, water is added to the precipitate, and the mixture agitated. Filter F' may be substantially identical with filter F, and the cake removed by scrapers 30 may be conveyed by a wax and gum discharge pipe 34 to a suitable point of wax recovery, as before. The filtrate from filter F' may be passed through a pipe 35 to pipe 28 to join the filtrate from filter F. Or, if desired, the filtrate from filter F' may be passed through a pipe 36 to a lime mixing tank 37, for preparation of lime saccharate, when the same is to be utilized in the initial or partial liming step in limer 22 supplied through lime line 24.

During filtration, it may prove desirable to add what may be termed "surface active agents," in accordance with my co-pending application Serial No. 601,079, filed June 22, 1945, and entitled "Method of Promoting Filtration." In such application, it is disclosed that certain surface active agents may be introduced into a slurry prior to its being subjected to filtration to counteract the tension, an effect normally present in such slurry during filtration, or to produce changes in contact angle, thereby to improve the efficiency of filtration. Such surface active agents tend to increase, sometimes by as much as 100%, the capacity of the filter. A surface active agent suitable for use in the treatment of sugar juices, particularly cane sugar juices, may be found in one of the sorbitols, such as sorbitan monolaurate, sorbitan monopalmitate, sorbitan monostearate, sorbitan monooleate, or sorbitan trioleate. Such surface active agent may be introduced into the material to be filtered in the limer 22, or at any other suitable point to insure a thorough dispersion through the sugar juice, since only a relatively small quantity of such agent will be found necessary, such as about one pound, more or less, per ton.

In accordance with this invention, the charcoal utilized as precoat material is produced by treatment of a portion of the bagasse or exhausted cane stalk, such as by diversion from conveyer 20 by an auxiliary conveyer 38 into an oven 39. In oven 39, charcoal is produced in the usual manner, i. e., by smothered burning. The oven may be of the batch type, or continuous, if desired, and cooled charcoal is passed by a conveyer 40 through crushing rolls 41 to reduce the same to a relatively fine size, and then to a storage bin 42. From the storage bin, the finely divided charcoal is withdrawn, as by a conveyer 43, for which a pipe, or other suitable transmitting device may be substituted, to be supplied to a mixing tank 44.

In tank 44, the finely divided charcoal is mixed with water supplied by a water line 45, and at a suitable temperature, such as 140° F., to correspond with the temperature desired for the precoat material. A suitable beating or agitating device may be installed in tank 44 to assist in the mixing. The charcoal mixture thus prepared is supplied by a line 46 to precoat tank 27 of filter F, and by branch line 47 to a similar precoat tank 27 of a filter F", the use of which will appear hereinafter. In addition, in certain instances, when filter F' is utilized, as indicated previously, the charcoal mixture may be supplied through a second branch line 48 to a charcoal tank 27 of filter F'.

The sugar juice removed by vacuum in filter F passes through pipe 28 to a heater 50, and thence through a pipe 51 to a combined limer and carbonator 52, again preferably constructed in the manner disclosed and claimed in Patent Number 2,520,957. The temperature of the juice is preferably raised to about 190° F. or 200° F., for effective liming and carbonation, and sufficient lime saccharate is added through a line 53 to increase the alkalinity of the juice, such as to a pH of 7.5 to 8.5.

In the combined limer and carbonator 52 the temperature is about 190° F. to 200° F., while the vacuum is maintained at a relatively high value, such as at about 3" Hg. From the limer and carbonator 52, the juice containing precipitate formed from the excess lime is passed through a pipe 54 to filter F", preferably of a type similar to filter F and adapted to utilize the charcoal precoat material supplied thereto in the manner previously indicated. The charcoal precoat material is not only effective in removing coagulated waxes and similar impurities, but is also effective in removing the precipitates formed by the excess lime, and also the organic acid impurities which form precipitates in the limer and carbonator 52. Any overflow from the pool of material to be filtered, contained above and between the drums of filter F", is returned by a pipe 55 to combined limer and carbonator 52. The wash water utilized in filter F" is preferably at or about the same temperature as the cake at that point, such as 190° F., and is supplied through a hot water line 56.

In a manner similar to that described previously, the cake removed by scrapers 30 is discharged into a repulping tank 58, and then through a pipe 59 to a centrifuge or centrifugal separator 60. In centrifuge 60, the lime is separated from the liquid and other constituents, such as organic acid precipitates, the lime being discharged to a pipe or conveyor 61 for transmission to a kiln 62, in which the calcium carbonate or other lime-containing constituents are reduced to CaO. The $CO_2$ gas produced in the kiln is led by a pipe 63 to the combined limer and carbonator 52, and also to a second combined limer and carbonator 64.

The organic acid precipitates and other impurities from centrifuge 60 may be passed to the sewer through a pipe 65, or if the amount of impurities is sufficiently small, the liquid separated out in the centrifuge may pass through a branch pipe 65' to lime mixing tank 37, to recover any slight sugar values in such liquid. The burnt lime, or CaO, produced in kiln 62 is transmitted by a conveyer 66 to lime mixing tank 37, and also, by a conveyor 67, to a lime saccharate mixing tank 68.

The filtrate from filter F" is passed through a pipe 69 to a heater 70 and thence through a pipe 71 to the second combined limer and carbonator 64. In heater 70, the juice is again brought up to about 200° F., any heat losses due to passage through filter F' being thus compensated for. In the combined limer and carbonator 64 the amount of lime, supplied in the form of lime saccharate through a line 72 from mixing tank 68, is proportioned so as to render the juice further alkaline, such as raising the pH to a value of about 8.5 to 9.5. The liming and carbonation steps carried out in the second limer and carbonator 64 may be at substantially the same pressure as in the first limer and carbonator, i. e., at about 3" Hg.

The treated juice, having a pH of about 8.5 and 9.5 and containing additional excess lime and other precipitates, is discharged through a pipe 73 to a leaf type filter 74, of any suitable construction. The wash water utilized in this leaf type filter is again preferably substantially the temperature of the cake, such as about 190° F., and supplied through a hot water line 75, which may be a branch of line 56.

The wash water drawn through the cake in the leaf filter 74, or "sweet water," is conveyed through a pipe 76 to a heat exchanger 77, and thence through a pipe 78 to lime saccharate mixing tank 68. The cake removed from filter 74 is deposited in a trough 79 and removed, as by a conveyer 80 to centrifuge 60, for centrifugal separation of the lime from other constituents.

The sugar juice removed in filter 74, normally termed "syrup" or "thick juice," is led through a pipe 81 to a point of further treatment, for removal of liquid and crystallization of the sugar content. Such subsequent treatment may be of a conventional nature, similar to that utilized in the treatment of beet sugar juice. In such treatment, a plurality of evaporators may be utilized to drive off successive amounts of moisture, the steam removed from each evaporator being utilized to heat the next evaporator, and the steam from the lower pressure evaporators being utilized to operate heaters 50 and 70, for instance. After evaporation, the juice may be decolorized by $SO_2$ produced by burning sulfur, and activated carbon, kieselgur, or other similar material. The juice so treated may then be passed to a vacuum pan in which the pressure is reduced and crystallization of sugar begun, and then continued in a suitable crystallizer, or the like, after which the material may be passed to centrifugals for washing and additional separation, followed by drying, grade separation, and packaging. The above steps are substantially conventional in the treatment of beet sugar juice, but may be varied as desired.

The incoming treated water in a pipe 82 is passed through a heat exchanger 83 to extract some of the heat from the contents of the lime saccharate mixing tank 68, and thence by a pipe 84 to heat exchanger 77, to extract some of the heat from the sweet water from leaf filter 74. From heat exchanger 77 the treated water passes into pipe 15, to be supplied to the mill M. If desired, the wash water for the filter F, which may be at substanitally the same temperature as the water supplied the mill M, may be provided from the same source. Also, the hot water lines 56 and 75 for filter F'' and leaf filter 74 may be heated by exhaust steam secured from some other source, such as the main engines of the factory, or directly from the boilers, which are preferably heated by burning the waste cane stalks or bagasse.

Raw water may be brought to the desired alkalinity, such as about 10 pH, by treatment with suitable materials, such as lime, soda ash, and alum. The raw water may be mixed with the water treatment materials in such a manner as to accelerate the reaction, and any precipitate or sludge permitted to settle. The treated water is then passed to pipe 82 for heating and subsequent use in the manner indicated. The sludge from the water treatment may be passed through a pipe 85 to centrifuge 60, for removal of lime and the rejection of undesirable constituents. Since it will normally be found necessary to use a considerable excess of lime to bring the alkalinity of the water to the desired value, the lime which settles in the sludge is well worth recovering, and in many instances will be found to provide sufficient lime for make-up of lime loss in the process. As will be evident, the lime recovery through use of centrifuge 60 is relatively high, and a considerable proportion of the lime entering the process as milk of lime or lime saccharate is thereby recovered.

In the centrifuge 60 substantially all of the iron, aluminum and undesirable metallic salts will be eliminated and discharged by conveyor 65. It is to be noted that these constituents are removed prior to calcination, so that there is no opportunity for a detrimental circulating load of impurities in the sugar juice circuit. Thus, hydrates, silicates, and the like, as well as salts of iron, aluminum, and other metals are eliminated.

From the foregoing, it will be apparent that the present invention provides a method of treating sugar juices, which results in marked increases in production, and eliminates previous steps thought necessary, because of the insoluble gums and waxes which have caused so much difficulty. By coagulating and eliminating the gums and wax-like impurities at the beginning of the purification process, not only can such waxes and the like be readily recovered, but also a greater latitude may be employed in subsequent steps. It will be apparent that the possibilities of greater recovery and more rapid and effective treatment of the sugar juices renders the present process highly feasible from an economic standpoint, even though a greater number of filters may be used than in prior processes.

Preferably, the waxes, gums, and wax-like impurities are removed at a temperature, such as about 140°, in which they have formed a colloidal dispersion or are in a crystalline state, and thereby may be filtered out. Such filtration is not difficult, particularly when filters of the type disclosed and claimed in Patent Number 2,403,021, are utilized. Also, elimination of the waxes, gums, and the like, prior to carbonation, permits the production of carbonate cakes which can be sufficiently purified in the centrifuge so that reburning is possible to recover the lime.

Other advantages of the present invention are that there is no long delay of time between the steps, such as results when clarifiers, either of the defecation or sedimentation type, are utilized. The reversion loss previously caused by such delay thus is minimized by the present invention, with a consequent over-all increase in production. Also, the feature of treating the incoming water to produce a high alkalinity not only removes impurities in the water, but also produces a raw juice which is closer to neutral, thereby reducing reversion loss and inhibiting biological infection. In this connection, it may prove desirable to wash the cane before milling, to reduce the possibility of biological infection in the crushing and initial liming steps.

An additional advantage in mixing lime with the juice under vacuum lies in the ability to prevent overheating of the juice during carbonation, and also increases molecular activity, and thereby the tendency for reaction during the relatively cold or partial liming step. By preventing overheating, either local or general, by liming under vacuum, reversion losses are reduced to a minimum, and other detrimental effects of overheating are avoided.

It will be evident that the present invention is particularly applicable to the treatment of cane sugar juice which contains gums, waxes and wax-like impurities, but it will also be evident that the novel concepts of this invention may be applied to similar solutions, such as sugar solutions which contain impurities of a somewhat similar nature. It will further be apparent that various alterations may be made in the application of the principles of this invention without departing from the spirit and scope thereof, as defined in the appended claims.

What is claimed is:

1. In a process of treating liquid containing dissolved sugar and also gums, waxes, or wax-like materials to be removed, the improvement which includes the steps of introducing a lime reagent into said juice in sufficient quantity to increase the pH value of said juice to not less than 7 nor more than 8 and maintaining the juice within a temperature range of 120° F. to 160° F. so as to cause coagulation of such waxes, gums, and wax-like impurities and then separating the coagulated impurities.

2. In a process of treating liquid containing dissolved sugar and also gums, waxes, or wax-like materials to be removed, as defined in claim 1, wherein said temperature is maintained at about 140° F. and the coagulated impurities are separated from the juice before further processing.

3. In a process of treating liquid containing dissolved sugar and also gums, waxes, or wax-like materials to be removed, the improvement which includes the steps of introducing an alkaline calcium reagent into said juice in sufficient quantity to impart thereto a pH value between 7 and 8 and maintaining the juice within a temperature range of 120° F. to 160° F. so as to cause coagulation of such waxes, gums, and wax-like impurities; removing such coagulated materials by filtration before heating said juice to a temperature sufficient to cause melting or re-solution of the materials to be removed; then heating said alkaline juice to a temperature of about 190°–200° F. and reacting the alkaline calcium reagent with a second reagent to form an insoluble precipitate.

4. In a process of treating a liquid containing dissolved sugar and also gums, waxes, or wax-like materials to be removed, the improvement which comprises heating such liquid to a temperature between 120° F. and 160° F., and adding a lime reagent in sufficient quantity to increase the pH value to not less than 7 nor more than approximately 8, so as to cause such gums, waxes, and wax-like materials to coagulate; removing the coagulated materials by filtration; heating such liquid to a temperature of about 190° F. or above; introducing lime saccharate into said juice; introducing carbon dioxide gas into said juice; removing, by filtration, precipitates thereby formed; and treating the product removed by filtration to separate lime compounds from other constituents by centrifuging.

5. In the process of treating cane sugar juices, the improvement which comprises heating such sugar juices to a temperature below 160° F.; introducing lime into such heated juice in sufficient quantity to impart a pH value of approximately 7–8 to the solution; removing, by filtration, the gums, waxes, and wax-like impurities thereby coagulated; heating the alkaline juice to a temperature above 160° F. and subsequently introducing additional quantities of lime and carbonating.

6. In the process of treating cane sugar juice, the improvement which comprises heating said juice to a temperature above 120° F., but below 160° F.; introducing lime into such heated juice to render such juice neutral or slightly alkaline; removing by filtration gums, waxes, and wax-like impurities thereby coagulated; heating said juice to a temperature above 160° F.; adding, under vacuum, additional quantities of lime to increase the alkalinity of said juice and precipitate further impurities; carbonating, under vacuum, the juice so limed; removing, by filtration, precipitates thereby formed; heating said juice to a temperature of about 190° F.; adding additional lime, under vacuum, to further increase the alkalinity of said juice and precipitate additional impurities; and carbonating such limed juice under vacuum.

7. In the process of treating sugar cane juice, the improvement which includes the steps of heating said juice to a temperature between 120° F. and 160° F. and introducing a sufficient quantity of a lime reagent to render such juice neutral or slightly alkaline; said alkalinity not to exceed a pH value of approximately 8 removing by filtration gums, waxes, and wax-like impurities thereby coagulated; repulping by mixing with water such material so removed by filtration; and filtering the repulped product.

8. In a process of treating sugar cane wherein the juice is extracted from the cane by crushing, the steps of flowing water having a pH value of approximately 10 over said cane during at least a portion of such crushing; heating the sugar juice so produced to a temperature of about 140° F.; introducing lime under vacuum into said juice in quantities sufficient to increase the pH value of the juice to at least 7; removing from the resulting alkaline juice, by a first filtration in which a precoat material comprising finely divided charcoal suspended in water is utilized, the gums, waxes, and wax-like impurities coagulated; heating the sugar juice removed by vacuum during such first filtration to a temperature of about 190° F.; introducing lime under vacuum into such heated juice; introducing carbon dioxide gas under vacuum into such juice after liming; removing, by a second filtration, precipitated impurities and lime carbonate cake; washing the cake by water at a temperature of about 190° F.; heating the sugar juice removed by vacuum during such second filtration to a temperature of above 190° F.; introducing lime saccharate under vacuum into such heated juice; carbonating under vacuum the juice so limed; removing, by a third filtration, the precipitated impurities and lime carbonate cake produced, the thick juice removed during such third filtration being suitable for further treatment by evaporation and crystallization to produce commercial quality sugar; washing said cake with water at a temperature above 190° F.; mixing lime and the sweet water removed by vacuum during washing to form lime saccharate; passing the cake removed during said second and third filtrations to a centrifugal separator for separating lime carbonate from other constituents; passing the lime carbonate so removed to a kiln for regeneration of lime and production of $CO_2$ gas for carbonation; and passing incoming water in heat exchange with the lime and sweet water mixing and, also, in heat exchange with the sweet water prior to such mixing.

9. In a process of treating sugar cane, as defined in claim 8, the additional steps which comprise treating raw water by heating to about 140° F. and by reagents, including lime, to increase the alkalinity thereof to a pH of about 10 and remove impurities; and passing the sludge from said water treatment to said centrifugal separator for separating lime carbonate from other constituents of such sludge and thereby provide additional lime for make-up.

10. The process for treating raw sugar juice containing gums or wax-like impurities which includes the steps of heating the juice to a temperature between 120° F. and 160° F., maintaining said juice in a zone of sub-atmospheric pressure, adding a lime reagent in a quantity sufficient to increase the pH value of the juice to not less than 7 nor more than 8, and then separating the coagulated impurities from the juice before further processing.

11. The process for treating raw sugar juice containing gums or wax-like impurities which includes the steps of heating the juice to a temperature between 120° F. and 160° F., maintaining said juice in a zone of sub-atmospheric pressure on the order of 27 inches of mercury, adding a lime reagent in a quantity sufficient to increase the pH value of the juice to not less than 7 nor more than 8, and then separating the coagulated impurities from the juice before further processing.

C. LYNN PETERSON.

REFERENCES CITED

The following references are of record in the file of this patent:

UNITED STATES PATENTS

| Number | Name | Date |
|---|---|---|
| 455,675 | Weinrich | July 7, 1891 |
| 1,097,724 | Mathews | May 26, 1914 |
| 1,233,919 | Rogan | July 17, 1917 |
| 1,271,914 | Krafft | July 9, 1918 |
| 1,528,501 | Morrison | Mar. 3, 1925 |
| 1,533,033 | Sauer | Apr. 7, 1925 |
| 1,579,171 | Zoul | Mar. 30, 1926 |
| 1,727,738 | Van Nes | Sept. 10, 1929 |
| 1,824,875 | Copp | Sept. 29, 1931 |
| 1,897,424 | Foster | Feb. 14, 1933 |
| 2,027,422 | Fortier | Jan. 14, 1936 |
| 2,059,971 | Scott | Nov. 3, 1936 |
| 2,206,341 | Villasuso | July 2, 1940 |

FOREIGN PATENTS

| Number | Country | Date |
|---|---|---|
| 28,589 | Great Britain | 1897 |

OTHER REFERENCES

Fairrie—Sugar—1st Ed., Liverpool, 1925, page 141.

The Industrial Chemist, January 1942, pages 17 and 18.

Fairrie—Sugar, 1st Ed., Liverpool, 1925, pages 12 and 13.

Spencer—Meade—"Cane Sugar Handbook," 8th Edition, N. Y., 1945, page 45.